United States Patent [19]

Chavez, Jr. et al.

[11] Patent Number: 5,095,061
[45] Date of Patent: Mar. 10, 1992

[54] PROCESS TO REDUCE PROPENYL POLYETHERS IN HYDROXYFUNCTIONAL POLYETHERS

[75] Inventors: Johnny Chavez, Jr.; Raymond A. Plepys, both of Lake Jackson; Craig A. McClure, Houston; Van A. Kent; Richard N. Gerstle, both of Lake Jackson, all of Tex.

[73] Assignee: The Dow Chemical Company, Midland, Mich.

[21] Appl. No.: 554,054

[22] Filed: Jul. 13, 1990

[51] Int. Cl.$^5$ ............................................. C08K 5/06
[52] U.S. Cl. ............................ 524/376; 252/182.27; 252/351
[58] Field of Search ................... 524/376; 252/182.27, 252/351

[56] References Cited
U.S. PATENT DOCUMENTS 4,129,718 12/1978 Muzzio ............................. 536/18.3
4,507,475 3/1985 Straehle et al. .................... 536/120

Primary Examiner—Harold D. Anderson
Assistant Examiner—Shelley A. Wright

[57] ABSTRACT

A process for reducing the amount of propenyl polyethers in hydroxy-functional polyethers comprising (1) contacting a neutral hydroxy-functional polyether, containing a propenyl polyether and water, and an acid catalyst soluble in the hydroxy-functional polyether under reaction conditions sufficient to convert at least a portion of the propenyl polyether to propionaldehyde; (2) contacting the product of step (1) and an epoxy compound to substantially scavenge the acid catalyst; and (3) stripping the product of step (2) to substantially remove the epoxy compound the the propionaldehyde.

The resulting hydroxy-functional polyethers contain reduced amounts of propenyl polyethers and can therefore be used to prepare polyurethane foams having a reduced tendency to discoloration.

18 Claims, No Drawings

PROCESS TO REDUCE PROPENYL POLYETHERS IN HYDROXYFUNCTIONAL POLYETHERS

BACKGROUND OF THE INVENTION

The present invention relates to hydroxy-functional polyethers. More particularly, it relates to a process to reduce propenyl polyethers in hydroxy-functional polyethers.

Polyether polyols prepared by polymerizing alkylene oxides often contain unsaturated compounds. When the alkylene ethers include propylene oxide units, 1,2-propenyl polyether is among these unsaturated compounds. Unfortunately, when these polyether polyols are used in the preparation of polyurethane products, particularly polyurethane foams, the presence of the propenyl polyethers tends to result in discoloration in the final product. Because of the undesirability of this problem, researchers have sought ways to purify the hydroxy-functional polyethers to reduce or eliminate the propenyl polyether content and thus to improve foam quality and/or marketability.

There are a variety of means of purifying polyether polyols. Certain mineral acids are used at various stages of treatment of polyether polyols in processes such as those disclosed in U.S. Pat. No. 2,996,550 to Simons; U.S. Pat. No. 4,507,475 to Straehle et al.; and Japanese Patent J56104936 (J87036052). Water, carbon dioxide and adsorbents such as magnesium silicate are used to remove alkaline catalysts in the process disclosed by Muzzio in U.S. Pat. No. 4,129,718. Water, ortho-phosphoric acid and adsorbents such as magnesium silicate are used to remove alkaline catalysts in the process disclosed by Straehle et al. in U.S. Pat. No. 4,507,475. Formic acid is used in the process disclosed by Peffer in U.S. Pat. No. 3,299,151. Each of these methods suffers certain disadvantages, generally in that they involve introducing materials that must later be removed from the polyethers.

Some polyether polyol treatments involve ion exchange resins. Purification of certain polyether polyols in some methods has involved water and certain cationic resins, as described in Japanese Patent J61043629. In the process described in German Patent 210,460, acid neutralization of a catalyst is followed by treatment with an ion exchange resin. A mercury-activated sulfonated polystyrene ion exchange resin is used in the process described in U.S. Pat. No. 3,271,462 to Earing. Certain ion exchange resins are optionally used in place of mineral acids for hydrolyzing acetals in some polyols, as shown in the process disclosed by Mills et al. in U.S. Pat. No. 2,812,360. Certain mixed resins are used to treat polyethylene glycols for human cell genetic transfection as disclosed in U.S. Pat. No. 4,650,909 to Yoakum. In the process disclosed by U.S. Pat. No. 4,355,188 to Herold et al., a polyol may be ion exchanged or neutralized after a strong base is used to treat it. The polyols are formed using metal cyanide complex catalysts.

Acidic ion exchange resins, particularly sulfonic acid ion exchange resins, are known to release acids into organic compounds. This phenomenon is discussed in, for instance, I. J. Jakovac's *Catalyst Supports and Supported Catalysts*, A. B. Stiles, Ed., Butterworths, Boston (1987) p. 190. Acids are, however, detrimental in certain formulations for forming polyurethanes.

Another problem encountered in conventional cation exchange resin beds is that the resin, which is in the hydrogen ion form as the acid catalyst for hydrolysis, is susceptible to deactivation due to fouling. This fouling is the result of both propionaldehyde polymer formation on the resin bead and the basicity in the polyol feed. The fouling necessitates recharging of the bed, which is time-consuming and decreases output. Another problem encountered is that the spent resin must be disposed of in an environmentally safe way, increasing toxic waste problems.

Thus, it would be useful in the art to have a process to stabilize polyether polyols by reducing or eliminating the presence of propenyl polyethers. Such method would ideally not necessitate ion exchange beds and also would not generate waste disposal problems.

SUMMARY OF THE INVENTION

Accordingly, the present invention provides a process for reducing the amount of propenyl polyethers in hydroxy-functional polyethers comprising (1) contacting a neutral hydroxy-functional polyether, containing a propenyl polyether and water, and an acid catalyst soluble in the hydroxy-functional polyether under reaction conditions sufficient to convert at least a portion of the propenyl polyether to propionaldehyde: (2) contacting the product of step (1) with an epoxy compound to substantially scavenge the acid catalyst; and (3) stripping the product of step (2) to substantially remove the water and propionaldehyde.

The result of this process is a polyether polyol with reduced or absent propenyl polyether content, which, when reacted with a polyisocyanate to form a flexible, semi-rigid or rigid polyurethane composition, shows a reduced tendency to discoloration when compared with polyurethane compositions prepared from polyether polyols containing a significant amount of propenyl polyether.

DESCRIPTION OF THE PREFERRED EMBODIMENTS

The present invention is applicable to a wide range of commonly and conventionally known hydroxy-functional polyethers. These include, for example, polyalkylene polyethers having at least one hydroxyl group, preferably, polyalkylene polyether polyols. These polyethers include the polymerization products of oxiranes or other oxygen-containing heterocyclic compounds, such as tetramethylene oxide prepared in the presence of a catalyst and/or initiated by water, and polyhydric alcohols having from about two to about eight hydroxyl groups, amine groups, or other active hydrogen sites. Preferably, the polyethers have at least some oxypropylene units produced from propylene oxide. As is known to those skilled in the art, the propylene oxide can be homopolymerized or copolymerized with one or more other oxiranes or other oxygen-containing heterocyclic compounds. The oxygen-containing heterocyclic compounds are preferably alkylene oxides.

The oxygen-containing heterocyclic compounds, hereinafter exemplified by but not limited to alkylene oxides, are suitably reacted either in mixture or sequentially. When more than one alkylene oxide is used, resulting polyethers can contain random, block, or random-and-block distributions of monomers. Mixtures of alkylene oxides most often produce randomly distributed alkylene oxide units. Sequential addition of different alkylene oxides most often produces blocks of the alkylene oxide segments in a polyether chain.

Exemplary oxiranes suitable for preparation of polyethers include ethylene oxide, propylene oxide, butylene oxide, amylene oxide, glycidyl ethers such as t-butyl glycidyl ether, phenyl glycidyl ether and the like. Other suitable oxiranes include 1,2-butylene oxide, 1,2-hexylene oxide, 1,2-decene oxide, 2-methoxy propylene oxide, methoxy ethylene oxide, 2,3-butylene oxide, 2,3-hexylene oxide, 3,4-decene oxide, 1,1,1-trifluoromethyl-2,3-epoxyoctane, styrene oxide and the like. The polyethers are also prepared from starting materials such as tetrahydrofuran copolymerized with alkylene oxide; epihalohydrins such as epichlorohydrin, epiiodohydrin, epibromohydrin, 3,3-dichloropropylene oxide, 3-chloro-1,2-epoxypropane, 3-chloro-1,2-epoxybutane, 3,4-dichloro-1,2-epoxybutane, 3,3,3-trichloropropylene oxide and the like; arylalkylene oxides such as styrene oxide; and the like. Preferably, the polyethers are prepared from alkylene oxides having from about two to about six carbon atoms such as ethylene oxide, propylene oxide, and butylene oxide.

More preferably, the polyethers are prepared from at least about 10, most preferably at least about 50, and even more preferably at least about 80 percent of an alkylene oxide selected from the group consisting of propylene oxide, 1,2-butylene oxide, 2,3-butylene oxide or mixtures thereof. Most preferably, propylene oxide is selected. Homopolymers of propylene oxide, or copolyethers of propylene oxide with ethylene oxide, butylene oxide and mixtures thereof are most preferred for use in the practice of the invention.

Illustrative alcohols suitable for initiating formation of a polyalkylene polyether include glycerine, ethylene glycol, 1,3-propylene glycol, dipropylene glycol, 1,2-propylene glycol, 1,4-butylene glycol, 1,3-butylene glycol, 1,2-butylene glycol, 1,5-pentane diol, 1,7-heptane diol, glycerol, glycerine, 1,1,1-trimethylolpropane, 1,1,1-trimethylolethane, hexane-1,2,6-triol, alpha-methyl glucoside, pentaerythritol, erythritol and sorbitol, as well as pentols and hexols. Sugars such as glucose, sucrose, fructose, maltose and the like and compounds derived from phenols such as (4,4'-hydroxyphenyl)2,2-propane, bisphenols, alkylphenols such as dodecylphenol, octylphenol, decylphenol and mixtures thereof and the like are also suitable for forming polyether polyols useful in the practice of the invention. Mono-alcohols, preferably mono-alcohols having from about 1 to about 18 carbon atoms and alkoxy-substituted mono-alcohols, including methanol, ethanol, isomers of propyl alcohol, isomers of butyl alcohol, and ethers thereof, are also suitable for forming the hydroxy-functional polyethers.

Amines suitable for reaction with oxiranes to form polyethers include aliphatic and aromatic mono- and polyamines, optionally having substituents such as alkyl, carboxyl, carboalkoxy groups and the like. Exemplary aromatic amines include aniline, o-chloroaniline, p-phenylene diamine, 1,5-diaminonaphthalene, methylene dianiline, the condensation products of aniline and formaldehyde, 2,4-diamino toluene, ethylene diamine, toluene diamine and the like. Exemplary aliphatic amines include methylamine, triisopropanolamine, isopropanolamine, diethanolamine, triethanolamine, ethylenediamine, 1,3-propylenediamine, 1,4-propylenediamine, 1,4-butylenediamine, mixtures thereof and the like. Amine based polyols are disclosed in, for example, U.S. Pat. No. 4,358,547.

The polyethers preferably have an average of from about 1 to about 8, preferably from about 2 to about 4, hydroxyl groups per molecule. The polyethers also are preferably of relatively high molecular weight, having molecular weights ranging from about 88 to about 50,000, preferably from about 1,000 to about 7,500. The term "relatively high molecular weight" as used herein refers to molecular weights in the 1,000 to 7,500 range. The polyethers may also preferably be capped, using for example, ethylene oxide of propylene oxide, as well-known to those skilled in the art.

The polyethers used in the present invention can be prepared by processes known to those skilled in the art, and are further discussed in, for example, *Encyclopedia of Chemical Technology*, Vol. 7, pp. 257–262, Interscience Publishers (1951): M. J. Schick, *Nonionic Surfactants*, Marcel Dekker, New York (1967): British Patent 898,306; and U.S. Pat. Nos. 1,922,459: 2,871,219; 2,891,073: and 3,058,921.

One or more catalysts are advantageously used in the preparation of the hydroxy-functional polyether. Conventional catalysts include alkali or alkaline earth metals or their corresponding hydroxides and alkoxides, Lewis acids, protonic acids, coordination compounds and the like. One skilled in the art can readily determine suitable amounts of alkylene oxides, initiators, catalysts and adjuvants as well as suitable processing conditions for polymerizing the alkylene oxides. Additional sources of detail regarding polymerization of alkylene oxides include J. Furukawa and T. Saegusa, *Polymerization of Aldehydes and Oxides*, Interscience, New York (1963), pp. 125–208; G. Odian, *Principles of Polymerization*, John Wiley & Sons, New York (2nd ed. 1970) pp. 512–521; J. McGrath, ed., *Ring-Opening Polymerization, Kinetics Mechanisms, and Synthesis*, American Chemical Society, Washington, D.C. (1985) pp. 9–21, 137–147 and 204–217; and U.S. Pat. Nos. 2,716,137; 3,317,508; 3,359,217; 3,730,922; 4,118,426: 4,228,310; 4,239,907; 4,282,387; 4,3326,047: 4,446,313; 4,453,022; 4,483,941 and 4,540,828; all of which are incorporated herein by reference in their entirety.

Preferred catalysts include basic catalysts, more preferably hydroxides and alkoxides of alkali and alkaline earth metals, particularly cesium, sodium, potassium and lithium. Potassium hydroxide is more preferred. When alkoxides are used as catalysts, the alkoxy groups advantageously contain from about one to about 36 carbon atoms. Exemplary of such alkoxides are alkoxides having anions of propylene glycol, glycerine, dipropylene glycol, propoxylated propylene or ethylene glycols and the like.

When a basic catalyst is used in the preparation of a hydroxy-functional polyether, there is resulting basicity which is neutralized to preferably less than about 20 ppm, more preferably less than about 10 ppm, most preferably less than about 5 ppm of the hydroxide or alkoxide catalyst in the polyether. Any acidity resulting from use of an acidic catalyst is similarly neutralized prior to use of the hydroxy-functional polyether in the present invention.

When these hydroxy-functional polyethers are prepared by conventionally used methods, such as are described above, they may contain relatively small amounts of propenyl polyethers. Thus, any polyether polyol containing a proportion of propenyl polyethers can be used in the practice of the present invention.

In the process of the present invention to reduce or eliminate the propenyl polyethers, the hydroxy-functional polyether is first contacted with an acid catalyst in the presence of water. In general the amount of propenyl polyether hydrolyzed is inversely proportional to the pKa of the acid catalyst selected, i.e., low pKa acids tend to produce high levels of hydrolysis, while high pKa acids show reduced hydrolytic activity and therefore higher amounts of propenyl polyethers remaining in the final product. Preferably the acid has an aqueous pKa value of less than about 2.5, preferably less than about 2.2, and most preferably less than about 1.5. The acid catalyst is preferably selected from Lewis acids, protonic acids and other acid catalysts as are well-known to those skilled in the art. Among the acids suitable for use are, for example, hydrochloric, sulfuric, phosphoric, phosphorous, oxalic, perchloric, nitric, benzene sulfonic, toluene sulfonic, naphthalene sulfonic, methane sulfonic, chloroacetic, dichloroacetic, trichloroacetic, and sulfurous acid, mixtures thereof and the like. It is important that the acid catalyst be soluble in the polyether polyol, and thus a liquid acid is preferred herein.

The acid catalyst is preferably added in an amount that is just sufficient to catalyze the conversion of propenyl polyethers to propionaldehyde. Preferably this amount is from about 0.03 to about 5.5 milliequivalents of acid per kilogram of hydroxy-functional polyether (meq acid/kg polyether), more preferably from about 0.1 to about 1.5 meq acid/kg polyether, and most preferably from about 0.3 to about 0.5 meq acid/kg polyether, wherein the acid has an aqueous pKa value of at least about 2.13.

Following addition of the acid catalyst the hydroxy-functional polyether/acid catalyst mixture is allowed to react for a time sufficient to allow the conversion of any propenyl polyethers present therein to propionaldehyde. Preferably the mixture is allowed to react for at least about 60 minutes, more preferably at least about 120 minutes. Those skilled in the art will know to determine the degree of conversion to propionaldehyde by analyzing the product for either propionaldehyde or propenyl polyether content. The rate constant for this reaction is on the order of about 1,000 liters per mole-minute at about 85° C. The contact time is preferably balanced with temperature to avoid degradation of the hydroxy-functional polyether. Degradation can result in discoloration of the product and/or a reduction in the product's reactivity to isocyanate in polyurethane manufacture.

Pressure to be maintained during the reaction can range from vacuum to 10 times atmospheric pressure. As is known to those skilled in the art, the volatility of the acid should be taken into account in selecting the pressure.

The reaction of the acid catalyst and the hydroxy-functional polyether is also preferably carried out at an elevated temperature. This temperature is preferably determined by the acid concentration and residence time in the reaction vessel. For most purposes the temperature is preferably in a range of from about 25° C. to about 200° C., more preferably from about 50° C. to about 150° C., and most preferably from about 90° C. to about 120° C.

Once the level of propenyl polyethers present in the hydroxy-functional polyether/acid catalyst mixture has been reduced to a desirable level, an epoxy compound is added to substantially scavenge the acid. As used herein, the term "substantially" means that at least about 85 percent of the acid of weight is preferably scavenged, more preferably at least about 90 percent, and most preferably at least about 95 percent. The epoxy compound can be selected from the group consisting of monoepoxide and polyepoxide compounds including alkylene oxides such as butylene oxide (all isomers), propylene oxide, ethylene oxide, styrene oxide and the like, as well as glycidyl ethers such as cresyl glycidyl ethers, phenylglycidyl ether and the like; epoxy resins, including those formed from epichlorohydrin and bisphenols, such as bisphenol A and bisphenol F and the like, as well as aliphatic and cycloaliphatic epoxy resins such as epoxycyclohexylmethyl epoxycyclohexyl carboxylates; epoxidized soybean oils: cresol resins; Novolac resins; mixtures thereof and the like.

The epoxy compounds preferably have structures represented by Formula 1:

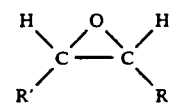

Formula I wherein R and R' (referred to hereinafter as R groups) are independently hydrogen or inert groups or R and R' together form an inert cyclic structure. Inert groups are groups which do not significantly reduce polyether stability under conditions suitable for scavenging the acid. Suitable inert groups include, for instance, additional epoxy groups, halogens, ester, alkyl, aryl, aralkyl, cycloalkyl, alkoxy, and aryloxy, aralkoxy and cycloalkoxy groups, which groups are unsubstituted or substituted by inert groups. Suitable halogens are chlorine, bromine, fluorine and iodine. Preferably R and R' together have fewer than about 60 carbon atoms. When R and R' together form an inert cyclic structure, that structure is preferably a cyclohexyl ring having inert groups as substituents. Preferably, the weight percent of oxirane oxygen in the epoxy compound is from about 3 to about 30, more preferably from about 6 to about 12 percent.

Epoxy compounds having more than one epoxy group preferably have molecular weights of from about 100 to about 1,000. Preferred epoxy compounds are epoxy compounds other than the alkylene oxides used in preparation of the polyether, such as ethylene oxide, propylene oxides and butylene oxides, and include other monoepoxy compounds and epoxy resins. Epoxy resins, i.e., molecules which have at least two glycidyl groups and which cure readily with amines, are particularly preferred.

Preferably, the epoxy compound is added in an amount sufficient to scavenge the acid catalyst, preferably from about 1 to about 300 epoxy equivalents (eq) per 1 acid catalyst eq, more preferably from about 5 to about 100 epoxy eq per acid catalyst eq, and most preferably from about 10 to about 50 epoxy eq per acid catalyst equivalent. The term "epoxy equivalent" as used herein means that amount of epoxy compound which contains an average of one epoxy group. The term "acid catalyst equivalent" as used herein means that amount of acid catalyst which contributes an average of one hydrogen ion in aqueous solution. An advantage of the present invention is that proportionately very little soluble acid catalyst is needed to convert virtually all of the propenyl polyether to propionaldehyde, and therefore very little epoxy compound is needed to scavenge the acid. Thus, contamination of the end product hydroxy-functional polyether is reduced or eliminated.

Contact of the epoxy compound and acid catalyst in the hydroxy-functional polyether preferably occurs at a temperature that is sufficient for reaction of the epoxy compound to reduce acidity, but insufficient to result in undesirable degradation of the polyether. A sufficient temperature is preselected such that the acidity is reduced within a time acceptable for a specific application. Preferably, the temperature is from about 0° C. to about 150° C., more preferably from about 50° C. to about 135° C., and most preferably from about 110° to about 130° C. These temperatures are suitably maintained for a time sufficient for the epoxy compound to react with the acid, preferably for at least about 1 minute, more preferably for from about 20 to about 120 minutes. As is known to those skilled in the art, temperature and residence time are preferably balanced to achieve the desired degree of removal of the acid catalyst.

Conditions suitable for reaction of the hydroxy-functional polyether with the epoxy compound are preferably avoided. For instance, materials known to catalyze the reaction of epoxy compounds with hydroxy-functional polyethers are preferably substantially absent or, at most, present in insufficient quantities to result in significant reaction. It is also preferred that the conditions of temperature and pressure to which the polyether is exposed are not sufficient to interfere undesirably with acidity reduction or to measurably alter the physical properties of the polyether.

According to the present invention, the epoxy compound and polyether are contacted or admixed using conventionally known mixing apparatus. Local concentrations of epoxy compound are advantageously and conveniently avoided by thorough mixing. The mixing can be carried out batchwise or continuously in accordance with procedures within the skill of those in the art.

Following addition of the epoxy compound to scavenge the acid, it is preferable to remove the propionaldehyde and water. To accomplish this the hydroxy-functional polyether is preferably stripped according to means and methods generally known to those skilled in the art. For example, counter-current steam stripping using 2 percent steam with vacuum stripping at 65 mm Hg vacuum and about 120° C. is an effective means of substantially removing the propionaldehyde. Counter-current stripping using other inert gases, for example, nitrogen, is also suitable. As used herein, the term "substantially" means that at least about 85 percent by weight of the propionaldehyde and water is preferably removed, more preferably at least about 90 percent, and most preferably at least about 95 percent.

The following examples are given to illustrate the present invention and are not intended to be, nor should they be construed as being, limitative of its scope. All parts and percentages are by weight unless otherwise indicated.

EXAMPLE 1

A hydroxy-functional polyether process stream (a propylene triol and mixed oxide feed containing 13 percent ethylene oxide, approximately 3515 molecular weight, with from 0.3 to 0.35 percent water) is metered at a rate of about 150 ml/min. Soluble HCl (1N) is added to the feed at a concentration of about 6 ppm by weight in the polyol. This mixture is then fed into a 5-gallon continuous stirred tank reactor (CSTR). The residence time in the reactor is varied from about 30 to about 120 minutes by varying the volume. Temperature in the CSTR is varied from about 100° C. to about 120° C.

BAKELITE* ERL-4221, a cycloaliphatic epoxy resin available from Union Carbide Co., is then added to scavenge the acid from the hydrolyzed product. The epoxy concentration is held constant at about 500 ppm by weight in the hydroxy-functional polyether. The acid/epoxy reaction is carried out in a propionaldehyde stripping column which operates at about 120° C. and 65 mm Hg. Temperature and residence time (5 minutes) are held constant in the stripping column.

Propenyl polyether concentration, both entering and leaving the CSTR, and propionaldehyde generation are measured. The propionaldehyde generation test is an indirect measurement of the efficiency of the epoxy resin in scavenging the acidity. The test consists of placing a 10 g sample of the test hydroxy-functional polyether into a head space analysis vial. To this sample 3 microliters of 1-propenyloxy-2-propanol are added. This particular enol ether has been found to adequately model propenyl ether end groups found in hydroxy-functional polyethers. The mixture is tightly capped and placed in an oven at about 100° C. for about 18 hours. The head space is then analyzed for propionaldehyde by gas chromatography. Table 1 shows the results for 8 separate samples, 4 taken at a CSTR temperature of 120° C. and 4 at a CSTR temperature of 100° C., over the range of residence times at each temperature.

TABLE 1

| Sample | Temperature, °C. | Residence Time, min. | Propenyl Conversion, % | Propionaldehyde Generation, ppm | Propionaldehyde Reduction, % |
|---|---|---|---|---|---|
| 1 | 120 | 120 | 95.0 | 2.75 | 98.5 |
| 2 | 120 | 90 | 92.5 | 1.41 | 99.3 |
| 3 | 120 | 60 | 73.8 | 0.98 | 99.5 |
| 4 | 120 | 30 | 61.4 | 0.91 | 99.5 |
| 5 | 100 | 120 | 93.7 | 1.02 | 99.5 |
| 6 | 100 | 90 | 59.7 | 1.40 | 99.3 |
| 7 | 100 | 60 | 89.5 | 1.30 | 99.4 |
| 8 | 100 | 30 | 56.7 | 1.50 | 99.3 |

EXAMPLE 2

A hydroxy-functional polyether (a glycerine-initiated, heteric copolymer mixed oxide feed consisting of about 87 percent propylene oxide and 13 percent ethylene oxide, approximately 3100 molecular weight) is up-flowed through a vessel large enough to provide a two-hour residence time at a rate of about 100 gallons per minute. Prior to entering the hydrolysis reactor, the polyol is mixed with dilute HCl to produce an HCl concentration of 6 ppm by weight and water in an amount of about 0.5 weight percent.

About 500 ppm of BAKELITE* is added to the hydroxy-functional polyether process stream after it exits the reactor. This mixture then passes through an in-line static mixer and is carried on to a stripping column wherein the epoxy/acid reaction is carried out and the propionaldehyde is removed from the product.

Samples of the hydroxy-functional polyether entering and exiting both the reactor and the stripping column are taken and analyzed for propenyl polyethers and propionaldehyde generation as in Example 1. The results are shown in Table 2.

TABLE 2

| Sample | Time, hrs. | Propenyl Conversion, % | Propionaldehyde Generation, ppm | Propionaldehyde Reduction, % |
|---|---|---|---|---|
| 9  | 6  | 93.4 | 0.67 | 99.7 |
| 10 | 8  | 96.0 | 0.72 | 99.6 |
| 11 | 10 | 91.2 | 0.41 | 99.98 |
| 12 | 12 | 95.9 | 0.41 | 99.8 |
| 13 | 14 | 93.8 | 0.38 | 99.8 |
| 14 | 16 | 95.7 | 0.41 | 99.8 |
| 15 | 18 | 96.5 | 0.38 | 99.8 |

EXAMPLE 3

A series of experiments are run to determine the degree of hydrolysis of propenyl polyethers in hydroxy-functional polyethers occurring using acids of various strengths. The experiments are performed as follows:

About 100 ppm each of acetic, formic, phosphoric, phosphorous, oxalic, trichloroacetic, and hydrochloric acids are added to separate 10 g hydroxy-functional polyether samples in a 20 milliliter (ml) head-space analysis vial. About 1,000 ppm of trichloroacetic acid is added to an additional sample. The hydroxy-functional polyether samples are glycerine-initiated polyoxypropylene polyol, about 5000 molecular weight, capped with ethylene oxide in an amount of 15 percent by weight. The polyol has an unsaturation value of 0.065 milliequivalents per gram (meq/g), of which 0.0174 meq/g is analyzed to be propenyl polyethers. The polyol has been treated with water in an amount of 0.5 percent by weight.

The polyol/acid mixture is placed in the headspace analyzer at 120° C. and the vapor space of various samples is checked for propionaldehyde content at the times shown and the results are recorded in Table 3. Analysis is done by gas chromatography. The theoretical maximum amount of propionaldehyde, based on starting propenyl polyether amounts, is 0.0174 meq/g, or about 1010 ppm.

TABLE 3

| Sample | Acid | pKa | 0.5 hr. (ppm) | 2 hr. (ppm) | 5 hr. (ppm) | 17 hr. (ppm) |
|---|---|---|---|---|---|---|
| 16  | Acetic | 4.76 | 0.6 | nd | nd | nd |
| 17* | Formic | 3.77 | nd | nd | nd | nd |
| 18  | Phosphoric | 2.12 | 21 | 477 | — | 800 |
| 19  | Phosphorous | 2.0 | 21 | 140 | 327 | — |
| 20  | Oxalic | 1.23 | 230 | 710 | — | 4 |
| 21  | Trichloroacetic (100 ppm) | 0.65 | 2 | 2 | — | — |
| 22  | Trichloroacetic (1,000 ppm) | 0.65 | 15 | 18 | — | — |
| 23  | Hydrochloric** | 0.0 | 610 | 1210 | — | 1270 |

*not an example of the present invention.
nd means not detected.
— means not tested.
**Hydrochloric acid is assumed to be 100 percent ionized.

The results indicate that there is generally an inverse relationship between the amount of propenyl ether hydrolyzed and the pKa of the acid catalyst used. Trichloroacetic acid appears to be an exception in that, while highly ionized and thus a strong acid, it shows limited hydrolysis at either the 100 ppm or 1,000 ppm concentrations in this experiment.

What is claimed is:

1. A process for reducing the amount of propenyl polyethers in hydroxy-functional polyethers comprising (1) contacting a neutral hydroxy-functional polyether, containing a propenyl polyether and water, and an acid catalyst soluble in the polyether under reaction conditions sufficient to convert at least a portion of the propenyl polyether to propionaldehyde; (2) contacting the product of step (1) and an epoxy compound to substantially scavenge the acid catalyst; and (3) stripping the product of step (2) to substantially remove the water and propionaldehyde.

2. The process of claim 1 wherein the hydroxy-functional polyether is a polyether polyol.

3. The process of claim 2 wherein the polyether polyol is a relatively high molecular weight, ethylene-oxide capped polyol.

4. The process of claim 1 wherein the soluble acid catalyst is an acid having an aqueous pKa value of less than about 2.5.

5. The process of claim 4 wherein the soluble acid catalyst is an acid having an aqueous pKa value of less than about 2.2.

6. The process of claim 4 wherein the soluble acid catalyst is an acid having an aqueous pKa value of less than about 1.5.

7. The process of claim 4 wherein the acid catalyst is used in an amount of from about 0.03 to about 5.5 milliequivalents of acid per kilogram of hydroxy-functional polyether.

8. The process of claim 4 wherein the acid catalyst is used in an amount from about 0.1 to about 1.5 milliequivalents per kilogram of hydroxy-functional polyether.

9. The process of claim 1 wherein the soluble acid catalyst is selected from the group consisting of hydrochloric acid, sulfuric acid, phosphoric acid, phosphorous acid, oxalic acid, trichloroacetic acid, perchloric acid, nitric acid, benzene sulfonic acid, toluene sulfonic acid, naphthalene sulfonic acid, methane sulfonic acid, chloroacetic acid, dichloroacetic acid, sulfurous acid and mixtures thereof.

10. The process of claim 9 wherein the soluble acid catalyst is selected from the group consisting of hydrochloric acid, sulfuric acid, phosphoric acid, phosphorous acid, oxalic acid, trichloroacetic acid and mixtures thereof.

11. The process of claim 1 wherein the epoxy compound is selected from the compounds represented by the formula:

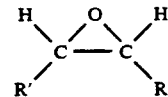

wherein R and R' are independently hydrogen or inert groups or R and R' together form an inert cyclic structure.

12. The process of claim 11 wherein the inert groups are selected from epoxy groups, halogens, ester groups, alkyl groups, aryl groups, aralkyl groups, cycloalkyl groups, alkoxy groups, aryloxy groups, aralkoxy groups and cycloalkoxy groups, which groups are unsubstituted or substituted by inert groups.

13. The process of claim 1 wherein the epoxy compound is selected from alkylene oxides, glycidyl ethers, aliphatic and cycloaliphatic epoxy resins, epoxidized soybean oils, cresol resins, Novolac resins and mixtures thereof.

14. The process of claim 13 wherein the epoxy compound is selected from cycloaliphatic epoxy resins, propylene oxide, butylene oxide and mixtures thereof.

15. The process of claim 1 wherein the stripping of the product of step (2) is vacuum counter-current stripping.

16. The process of claim 15 wherein the stripping is steam stripping.

17. The process of claim 15 wherein the stripping is done using an inert gas.

18. The process of claim 17 wherein the inert gas is nitrogen.

* * * * *